UNITED STATES PATENT OFFICE.

ALFRED GEORGE HAWKINS, OF HORNSEY, ENGLAND, ASSIGNOR OF ONE-HALF TO ASSOCIATED NEWSPAPERS LIMITED, LONDON, ENGLAND.

STEREOTYPING FLONG.

1,425,474. Specification of Letters Patent. Patented Aug. 8, 1922.

No Drawing. Application filed March 21, 1921. Serial No. 454,198.

*To all whom it may concern:*

Be it known that I, ALFRED GEORGE HAWKINS, a subject of the King of Great Britain, residing at 10 Ribblesdale Road, Hornsey, in the county of Middlesex, England, have invented certain new and useful Improvements in or Relating to Stereotyping Flongs, of which the following is a specification.

This invention relates to the preparation of an improved flong or matrix material for the production of stereotype plates.

This flong is used for taking moulds from type faces, and from these moulds stereotype casts are made. It is of great importance that these moulds should be capable of giving as many casts as possible and also that the face of the flong should be such that a very perfect cast is obtained therefrom. In practice it has been found difficult, if not impossible, to combine these qualities, i. e. to obtain a flong which has the requisite toughness and durability and at the same time gives sharp casts of good surface.

The present invention relates to the manufacture of a flong which possesses all these necessary qualities in a high degree.

In manufacturing this flong I incorporate into it, (that is, the papier mâché or pasted paper basic material) either throughout its mass or throughout an outer layer or layers, a proportion of casein, which serves to bind the material and prevent fracturing under normal conditions of work.

In carrying out this part of the invention I prefer to proceed as follows: The basic material of the flong, prepared in any suitable manner, is immersed in or otherwise treated with a solution of casein and borax for some hours, say about twelve to fifteen hours; and then subjected to a heavy rolling pressure to eliminate most of the moisture, after which it is hung up and left until dried. A suitable solution is made by mixing dry 82 parts of casein with 18 parts of borax, adding to one lb. of such mixture 10 lbs. of cold water and 2 oz. carbolic acid or like preservative, heating to boiling point and cooling down, with the addition of a further 7 lbs. of cold water.

A further feature of my invention relates to the improvement of the face of the flong. For this purpose the flong so treated may be faced with a facing composition of which the following can be given as an example;— 24 parts china clay, 6 parts rice starch, 3 parts casein, 1 part borax and 66 parts water, with the addition of about 2 per cent of a preservative on mixing. The composition is applied to one side of the flong with a fine brush and allowed to dry.

A dry flong of great strength and durability is produced by the method above described, the flong taking a sharp and clean impression.

What I claim and desire to secure by Letters Patent of the United States is:—

1. A stereotyping flong having incorporated in the basic material a proportion of casein.

2. A stereotyping flong having incorporated in the basic material throughout an outer layer thereof a proportion of casein.

3. A method of making stereotyping flong which consists in treating the basic material with a solution containing casein, pressing out excess moisture and drying the flong.

4. A method of making stereotyping flong which consists in treating the basic material with a solution in water of about 82 parts casein and about 18 parts borax, pressing out excess moisture and drying the flong.

5. A stereotyping flong havin incorporated in its substance a proportion of casein, and a facing composition comprising china clay, starch, casein and borax covering the surface of the said flong.

ALFRED GEORGE HAWKINS.